United States Patent
Delame et al.

(10) Patent No.: US 11,799,965 B2
(45) Date of Patent: Oct. 24, 2023

(54) SYSTEM FOR COMMUNICATING VIA SIGNALS OF LI-FI TYPE

(71) Applicant: LATELEC, Labege (FR)

(72) Inventors: Cyrille Delame, Toutens (FR); Serge Berenger, Paris (FR); Yoann Rebiere, Ramonville (FR)

(73) Assignee: LATELEC, Labege (FR)

(*) Notice: Subject to any disclaimer, the term of this patent is extended or adjusted under 35 U.S.C. 154(b) by 525 days.

(21) Appl. No.: 17/057,592

(22) PCT Filed: May 24, 2019

(86) PCT No.: PCT/EP2019/063527
§ 371 (c)(1),
(2) Date: Nov. 20, 2020

(87) PCT Pub. No.: WO2019/224377
PCT Pub. Date: Nov. 28, 2019

(65) Prior Publication Data
US 2021/0195720 A1    Jun. 24, 2021

(30) Foreign Application Priority Data
May 25, 2018   (FR) ..................................... 18 54440

(51) Int. Cl.
*H04B 10/00* (2013.01)
*H05B 47/19* (2020.01)
(Continued)

(52) U.S. Cl.
CPC .............. *H04L 67/12* (2013.01); *B64D 47/02* (2013.01); *H04B 10/116* (2013.01);
(Continued)

(58) Field of Classification Search
CPC .. H04B 10/00; H04B 10/114; H04B 10/1143; H04B 10/1149; H04B 10/116;
(Continued)

(56) References Cited

U.S. PATENT DOCUMENTS 10,693,557 B1 *   6/2020   Ayotte ................. H04B 10/116
10,924,185 B2 *   2/2021   Leigh ................... H04J 14/0216
(Continued)

FOREIGN PATENT DOCUMENTS

EP            2768162 A1      8/2014

OTHER PUBLICATIONS

Vijayalakshi et al., "New strategy in wireless communication: Li-Fi for delivery of broadband and media content in aircraft without intrusion," IEEE Wispnet 2017 Conference, Mar. 22, 2017, pp. 1838-1840.
(Continued)

*Primary Examiner* — Thai Pham
(74) *Attorney, Agent, or Firm* — H&I PARTNERS; C. Andrew Im; Jean-Christophe Hamann

(57) ABSTRACT

A system to communicate via modulated optical signals of the Li-Fi signal type to transmit data to and from a plurality of defined privileged spaces. The communicating system includes a plurality of first light sources, each first light source emitting, in the infrared, a first modulated optical signal. A plurality of optical fibers, each optical fiber guiding the first modulated optical signal from a single first light source in the direction of an optical interface. The optical interface transmitting the first modulated optical signal into a defined privileged space. Each optical fiber also transporting a second modulated optical signal from the associated defined privileged space in the direction of a device configured to acquire the second modulated optical signal.

9 Claims, 3 Drawing Sheets

(51) Int. Cl.
- *B64D 47/02* (2006.01)
- *H04L 67/12* (2022.01)
- *H05B 47/195* (2020.01)
- *H05B 47/165* (2020.01)
- *H05B 47/175* (2020.01)
- *H04B 10/114* (2013.01)
- *H04B 10/116* (2013.01)
- *H04B 10/25* (2013.01)

(52) U.S. Cl.
CPC ..... *H04B 10/1143* (2013.01); *H04B 10/1149* (2013.01); *H04B 10/25* (2013.01); *H05B 47/165* (2020.01); *H05B 47/175* (2020.01); *H05B 47/195* (2020.01)

(58) Field of Classification Search
CPC .............. H04B 10/25; H04B 10/25752; H04B 7/18506; H05B 47/10; H05B 47/19; H05B 47/195; B64D 47/00; B64D 47/02; B64D 11/00; B64D 11/00155
See application file for complete search history.

(56) References Cited

U.S. PATENT DOCUMENTS

| 2012/0275795 A1* | 11/2012 | Chan .................... H04B 10/116 398/128 |
| 2014/0226983 A1* | 8/2014 | Vargas ............. H04N 21/41422 398/66 |
| 2020/0170507 A1* | 6/2020 | Le Guilcher ........ A61B 5/4848 |

OTHER PUBLICATIONS

Yin et al., "LIFi: Transforming Fibre into Wireless," Proc. SPIE, Jan. 28, 2017, pp. 1012802-1 to 1012802-9, vol. 10128.

* cited by examiner

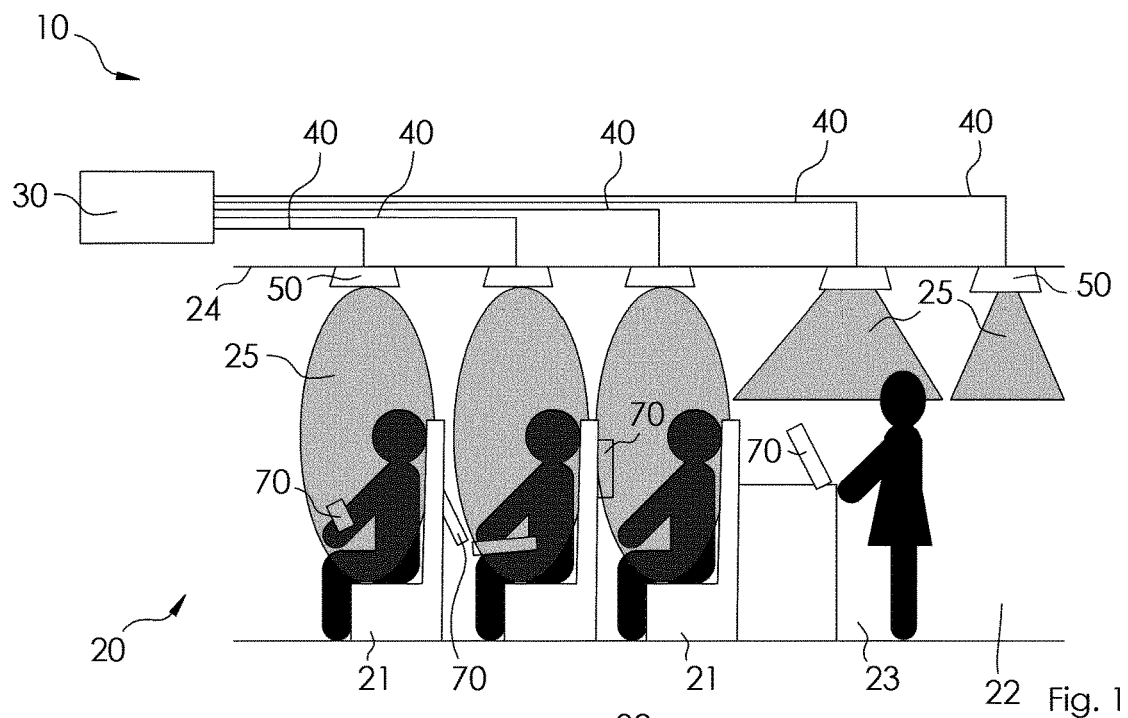
Fig. 1
Fig. 2
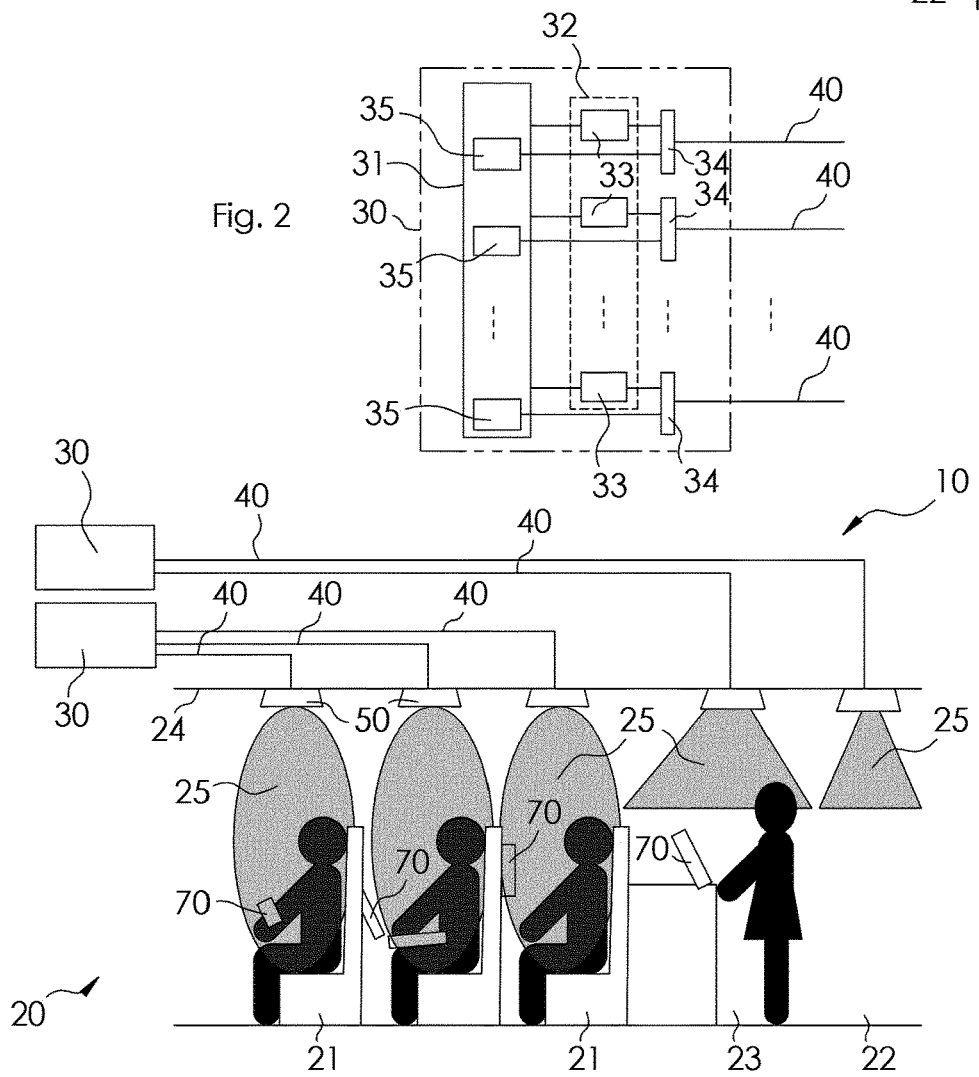
Fig. 3

SYSTEM FOR COMMUNICATING VIA SIGNALS OF LI-FI TYPE

RELATED APPLICATIONS

This application is a 0 371 application of PCT/EP2019/063527 filed May 24, 2019, which claims priority from French Patent Application No. 18 54440 filed May 25, 2018, each of which is incorporated herein by reference in its entirety.

FIELD OF THE INVENTION

The present invention falls within the field of wireless communications. The invention preferably relates to a system for communicating data via Li-Fi signals coming from an infrared light source and/or a visible light source. The invention is in particular intended for an application in the aeronautical field, to equip an aircraft.

BACKGROUND OF THE INVENTION

Conventional aircraft cabins, in particular for mainline planes, are provided with pieces of equipment, such as screens, generally placed at the passenger seats, to offer each passenger limited access to media such as films.

To interconnect the various pieces of equipment present in the cabin, a large number of wirings must be installed throughout the cabin in areas that are sometimes not easily accessible, generally disposed under the floor or in the ceiling.

The weight of these wirings and the associated connections particularly affects the mass balance of the aircraft.

In addition, when an airline company has to redesign the cabin of the aircraft, all or part of these wirings must be replaced, resulting in significant maintenance times and downtime for the aircraft.

The replacement of these wired links by wireless links, in particular via the Wi-Fi (acronym for Wireless Fidelity) protocol, allowed to overcome the mentioned difficulties.

As a reminder, Wi-Fi allows to create a local wireless network, over a radius of several tens of metres, using radio waves from the electromagnetic spectrum.

Wireless connections of the Wi-Fi type have also allowed to cope with the growing need of passengers who also wish to take advantage of their electronic devices, such as phones, tablets and laptops.

However, this Wi-Fi communication protocol has many disadvantages, known elsewhere in their applications other than avionics:
  the use of Wi-Fi may cause interference with other apparatuses present on the aircraft;
  the use of Wi-Fi moreover poses problems for the security of communications, the radio waves being able to pass through the walls; the signals can thus be intercepted and hacked,
  the use of Wi-Fi also raises public health questions regarding the risks associated with prolonged exposure to such electromagnetic radiation.

OBJECT AND SUMMARY OF THE INVENTION

The present invention aims at overcoming the aforementioned disadvantages.

To this end, the present invention proposes a communication system by modulated optical signals of Li-Fi (acronym for Light Fidelity) signal type.

Li-Fi is a wireless communication technology based on the use of light in the visible range (wavelength comprised between 400 nm and 780 nm) or the infrared range (wavelength comprised between 780 nm and 2 µm) as information carrier.

The principle of Li-Fi is based on encoding and sending data via amplitude, frequency or phase modulation of a light source, according to a standardised protocol.

The communication system according to the invention allows the transmission of data to and from a plurality of defined privileged spaces.

The communication system is intended in particular for the aeronautical field, to equip an aircraft, but can also be intended for any other field, such as the railway field or else the automotive field, without this list being exhaustive, to equip any means of transport.

The communication system comprises:
  a plurality of first light sources, each first light source being adapted to emit, in the infrared, a modulated optical signal of the Li-Fi signal type, called first modulated optical signal,
  a plurality of optical fibres,
  a plurality of optical interfaces, one optical interface at an end of each optical fibre,
each optical fibre being adapted to guide a first modulated optical signal, coming from only one of said first light sources, in the direction of one of said optical interfaces adapted to broadcast said first modulated optical signal into a defined privileged space.

Each optical fibre is also adapted to transport a modulated optical signal of the Li-Fi signal type coming from the associated defined privileged space, called second modulated optical signal, in the direction of a device for acquiring said second modulated optical signal.

The second modulated optical signal is emitted by a light source located in a piece of equipment disposed in the privileged space. Preferably, said light source emits in the infrared.

Such a communication system allows the creation of a delimited privileged space, and allows a connection to a network given to a user located only in this privileged space. Any attempt to connect to this network outside of the privileged space is made impossible, thanks to the use of Li-Fi technology.

Such a communication system advantageously allows a connection, which is simultaneous or not, of all the pieces of equipment (mobile phone, tablet, fixed screen, laptop, etc.) disposed in a privileged space, to a given network.

Such a communication system, combining Li-Fi technology and optical fibre for its ability to distribute data, allows to overcome the problems of installation complexity and wiring weight, but also constraints related to data security, electromagnetic pollution encountered with Wi-Fi and its health problems.

The use of infrared light, invisible to the human eye, for the distribution of data, via Li-Fi technology, within the privileged space allows to provide a user located in this privileged space, with a connection, regardless of the lighting illuminating the privileged space.

Such a communication system according to the invention advantageously allows to broadcast distinct data into each privileged space. It allows to address to a user identified in a privileged space, specific data adapted to said user.

According to particular implementations, the communication system according to the invention further meets the following features, implemented separately or in each of their technically operative combinations.

In preferred embodiments of the invention, to reduce power consumption as well as cost, each first light source is a light-emitting diode.

In other embodiments of the invention, each first light source is a laser.

In particular embodiments of the invention, the communication system comprises a single second light source adapted to emit an optical signal in the visible spectrum, called visible optical signal. This second light source allows to illuminate several privileged spaces. Each optical fibre is adapted to transport optical signals coming from only one of said first light sources and from the second light source, in the direction of one of said optical interfaces.

In such an embodiment, the distribution of the visible light and data, in a privileged space, takes place on a single medium, the optical fibre. This arrangement facilitates installation and further reduces the weight of the wiring.

The use of two separate light sources, one emitting in the visible range to illuminate the privileged space, the other to distribute the data, allows to provide a user located in the privileged space with access to internet data and/or entertainment when the light is off in said privileged space.

In particular exemplary embodiments of the invention, the second light source is adapted to emit an optical signal of white light.

In preferred embodiments, the communication system comprises a plurality of second light sources, each second light source being adapted to emit an optical signal in the visible spectrum, called visible optical signal. Each second light source is intended for lighting a single privileged space. Each optical fibre is adapted to guide the first optical signal coming from one of said first light sources and the visible optical signal coming from only one of said second light sources, in the direction of one of said optical interfaces.

According to preferred embodiments, each second light source is adapted to emit a modulated visible optical signal. The communication system further comprises a plurality of switching devices, one switching device per privileged space. Each switching device being adapted:

when a privileged space is illuminated by a second light source, to deactivate the first light source, when a privileged space is not illuminated by a second light source, to activate the first light source.

Thus, when the privileged space is lighted, the data communication and the lighting is carried out by the same second light source. When the privileged space is not lighted, the data communication is carried out only by the first light source.

In preferred embodiments, each second light source is a combination of at least two light-emitting diodes, or lasers, each adapted to emit a different colour temperature to create mood light in the privileged space.

According to preferred embodiments, the plurality of first light sources, the plurality of second light sources and the plurality of acquisition devices are arranged in a data transmission/reception unit.

According to preferred embodiments, the plurality of first light sources and the plurality of acquisition devices are arranged in a data transmission/reception unit, and the plurality of second light sources are arranged outside said data transmission/reception unit.

According to particular embodiments of the invention, the communication system comprising a device for controlling the turning on/off of the optical signal in the visible spectrum in a privileged space.

The invention also relates to an aircraft comprising a communication system as defined above in one of its embodiments.

Such a communication system arranged in an aircraft allows the creation of a privileged space allowing a connection of a passenger to the internal and/or external network of the aircraft only in his privileged space, for example a physical location linked to the seat for the passenger. Any connection external to the aircraft on the aircraft network is made impossible, thanks to the use of Li-Fi technology.

Such a communication system arranged in an aircraft advantageously allows to distribute data internal and/or external to the aircraft to one or more multiple pieces of equipment (mobile phone, tablet, fixed screen, laptop, etc.) disposed in the same privileged space.

Such a communication system, combining Li-Fi technology and optical fibre for its ability to distribute data, allows to overcome the current problems of installation complexity and the weight of wiring in the aircraft but also the constraints related to data security, electromagnetic pollution encountered with Wi-Fi.

Such a communication system arranged in an aircraft advantageously allows to broadcast distinct data into each privileged space. It allows to address to a user (passenger, cabin crew members) identified in a privileged area specific data adapted to said user. For example, it may be considered to inform an identified passenger about his next connection, any delays . . . . It may also be considered to prohibit the broadcasting of entertainment data to cabin crew members.

BRIEF DESCRIPTION OF THE DRAWINGS

The invention will be better understood upon reading the following description given with reference to the appended drawings:

FIG. 1 illustrates a schematic representation of an aircraft cabin incorporating a first configuration of a communication system;

FIG. 2 illustrates an example of a data transmission/reception unit of the communication system of FIG. 1;

FIG. 3 illustrates a schematic representation of an aircraft cabin incorporating a variant of the first configuration of the communication system;

DETAILED DESCRIPTION OF AN EMBODIMENT OF THE INVENTION

Figure 4:
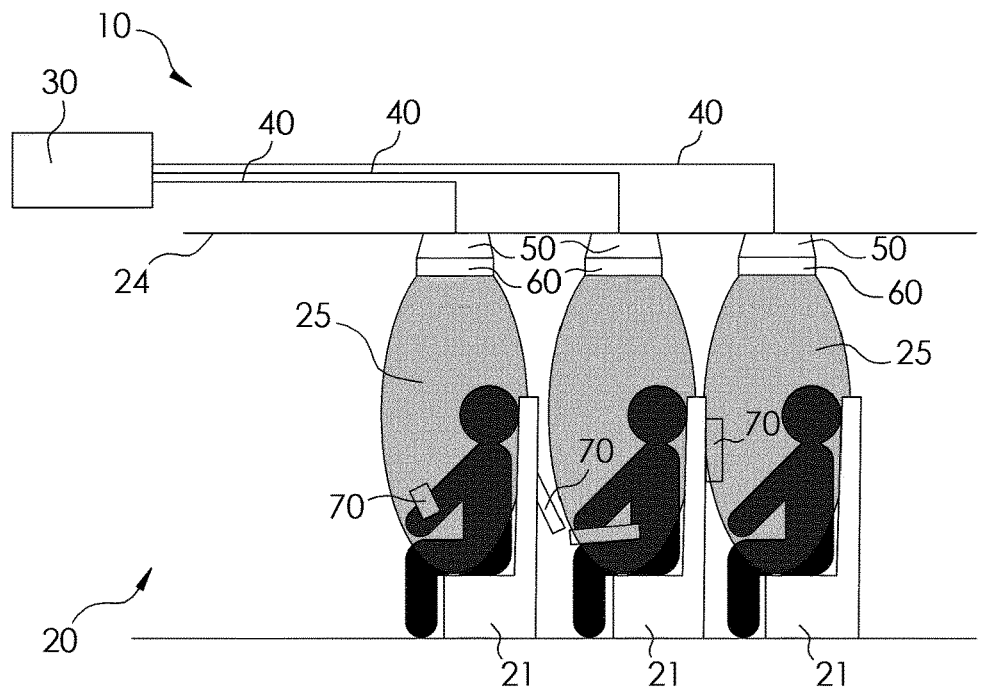
FIG. 4 illustrates a schematic representation of an aircraft cabin incorporating a second configuration of a communication system.

The present invention relates to a data communication system.

The communication system can, in general, equip any means of transport, in particular those in the aeronautical, railway or automotive fields, without this being restrictive of the invention.

The invention is described in the particular context of one of its preferred fields of application wherein the communication system is disposed in a civilian airliner. However, nothing excludes having the communication system in any other type of aircraft, whether it is civilian or military. Thus, it may be possible for example to have the communication system in a helicopter.

FIG. 1 schematically illustrates the interior of an aircraft cabin 20 wherein a communication system 10 according to a first configuration of the invention is deployed. The cabin 20 conventionally comprises a plurality of seats 21, in particular for accommodating passengers, corridors 22 for the passage of passengers and cabin crew members, and galley spaces 23.

In the remainder of the description, the acronym CCM will be used to designate the cabin crew members.

In the example of FIG. 1, three passenger seats 21, a galley space 23 and a corridor 22 are shown.

The communication system 10 according to the invention is adapted to communicate with pieces of equipment 70 either boarded by passengers, such as for example a tablet, a telephone or else a laptop, or present on board the aircraft, such as screens integrated into the seats 21 of the aircraft.

The communication system 10 according to the invention advantageously allows passengers and members of the CCM to have access to entertainment data or Internet data, regardless of the piece of equipment 70 used, in defined privileged spaces 25.

Privileged space 25 means a unique and personal connection space allowing a passenger or a member of the CCM to receive and/or send data internal and/or external to the aircraft in a secure and personalised manner in a defined physical location.

In a particular exemplary embodiment, a privileged space 25 may correspond to a space delimited by a seat 21, for a passenger. Thus, each passenger, when seated in his seat 21, benefits from a unique and personal connection space to receive and transmit data confidentially. Other privileged spaces may allow to cover parts of the corridor 22 or a galley space 23, mainly for the CCM.

The communication system 10 preferably comprises, as illustrated in FIG. 1:
 a unit 30 for transmitting/receiving data,
 a plurality of optical fibres 40, at the output of the data transmission/reception unit 30,
 a plurality of optical interfaces 50, one optical interface 50 at the end of each optical fibre 40.

The data transmission/reception unit 30 comprises, as illustrated in FIG. 2, a control unit 31 adapted to convert a digital signal, carrying the data information to be transmitted, into a modulated optical signal. The modulated optical signal is of the Li-Fi type.

This digital signal comes, for example, from the central processing units of on-board multimedia systems (IFE), of cabin systems.

The data transmission/reception unit 30 further comprises a plurality of first light sources 33.

Each first light source 33 receives an instruction from the control unit 31 and is controlled to emit a modulated optical signal, called first modulated optical signal. It is quite clear that the first modulated optical signal is of the Li-Fi type.

In a non-limiting exemplary embodiment, this modulation of the optical signal is obtained by controlling the intensity of the first light source 33 in a variable manner at very high frequency.

Each first light source 33 is advantageously adapted to emit in the infrared range.

In a preferred embodiment, each first light source 33 is a light-emitting diode (LED).

In another exemplary embodiment, each first light source 33 is a laser.

The set of first light sources 33 preferably forms a first emission module 32.

The data transmission/reception unit 30 further comprises a plurality of optical modules 34.

An optical module 34 is adapted to couple a first modulated optical signal coming from a first light source 33 into an optical fibre 40.

It is understood here that there are as many optical fibres 40 and optical modules 34 as there are first light sources 33.

An optical fibre 40 is adapted to transport a first optical signal coming from a first light source 33 to an optical interface 50.

An optical interface 50, due to its geometric features, allows to confine a first modulated optical signal, emitted by a first light source 33, in a restricted broadcasting cone defining the volume of a privileged space 25.

The number of first light sources 33, by extension the number of associated optical modules 34, optical fibres 40 and optical interfaces 50, advantageously corresponds to the number of privileged spaces 25 that are desired on board the aircraft.

In the non-limiting exemplary embodiment illustrated in FIG. 1, the communication system 10 is intended to transmit data to and from five privileged spaces 25. This communication system 10 comprises:
 a unit 30 for transmitting/receiving data comprising five first light sources (not shown),
 five optical fibres 40 at the output of the data transmission/reception unit 30, each optical fibre 40 being connected to a first light source 33,
 five optical interfaces 50, one optical interface 50 at the output of each optical fibre 40; three optical interfaces 50 each disposed at a passenger seat 21, one optical interface 50 disposed at the corridor 22 and one optical interface 50 disposed at the galley space 23. Each optical interface 50 broadcasts a first modulated optical signal into a privileged space 25.

The optical fibres 40 are preferably deployed in an upper part of the aircraft, as illustrated in FIG. 1.

The optical interfaces 50 are preferably disposed in a ceiling 24 of the aircraft, for example above each seat 21, near the individual aerators.

The data transmission/reception unit 30 is in turn preferably delocalised, for example in a part of the aircraft gathering all or part of the electronic and electrical pieces of equipment necessary for the operation of the aircraft.

In a preferred exemplary embodiment of an optical fibre, the optical fibre 40 is a glass optical fibre. Such an optical fibre allows to transport an optical signal, with limited attenuation.

In other non-limiting exemplary optical fibre embodiments, said optical fibre may be a plastic fibre or a plastic-coated glass fibre, such as a PCF fibre (acronym for "Polymer Cladded Fiber"), a PCS fibre (acronym for "Plastic Cladded Silica"), an HCS fibre (acronym for "Hard-Clad Silica") or else an HPCF fibre (acronym for "Hard Polymer Cladded Fibre").

The optical interface 50 is advantageously a passive optical interface, that is to say an optical interface not supplied with electricity.

In an exemplary embodiment of an optical interface, the optical interface 50 comprises a lens or a lens system.

In an embodiment of an optical interface, the optical interface 50 is a lens.

In an embodiment, the optical interface 50 is installed, for example on the ceiling, with at least one degree of rotation, so that the passenger and/or the cabin crew members can orient it, and consequently orient the positioning of the privileged space, according to his wishes, within the limit of not covering the closest privileged space.

The transmission/reception unit 30 can easily be assimilated to an access point called Li-Fi access point, configured to generate and transmit Li-Fi type signals. The optical fibres 40 and the optical interfaces 50 are optical elements advantageously intended for, respectively, transporting these Li-Fi type signals and broadcasting them into privileged spaces.

In order to carry out the internet and/or entertainment data communication from the data transmission/reception unit 30 to a piece of equipment 70 in a privileged space, said piece of equipment should preferably comprise a module for acquiring the first modulated optical signal (not shown). Said acquisition module is adapted to detect the variations in intensity of the first modulated optical signal emitted by the first light source 33, and broadcasted by the optical interface 50. The acquisition module of the equipment 70 converts the data of variations in intensity of the optical signal into a digital signal. This digital signal is then processed and translated into information that can be used by said piece of equipment.

In an exemplary embodiment, the acquisition module of the piece of equipment is a photodiode.

To establish two-way data communication between the communication system and a piece of equipment 70 in a privileged space, and to reciprocally allow data to be transmitted from said piece of equipment, the communication system 10 comprises a device 35 for acquiring a modulated optical signal, preferably placed in the control unit 31.

Thus, to allow data communication in a bidirectional manner per privileged space, the control unit 31, in the downward communication direction, is adapted to convert a digital signal into a modulated optical signal and, in the upward communication direction, is adapted to convert a modulated optical signal into a digital signal.

"In the downward communication direction" means that the communication system 10 operates by transmitting data to a piece of equipment 70.

"In the upward communication direction" means that the communication system 10 operates by receiving data from a piece of equipment 70.

In an exemplary embodiment of an acquisition device, the acquisition device of the communication system 10 is a photodiode 35.

Preferably, the communication system 10 comprises as many acquisition devices 35 as there are first light sources 33.

Thus, for each privileged space 25 that is desired in the aircraft, a first light source 33, an acquisition device 35, an optical fibre 40 and an optical interface 50 are associated.

Each acquisition device 35 is adapted to detect variations in the intensity of a modulated optical signal, called second modulated optical signal, emitted by a piece of equipment 70, located in the privileged space 25, provided with a light source (not shown). It is quite clear that the second modulated optical signal is of the Li-Fi type. Preferably, the light source of the piece of equipment 70 emits in the infrared range.

In a non-limiting exemplary embodiment of this light source, said light source of the piece of equipment 70 is a light-emitting diode or a laser.

The light source of the piece of equipment 70 is adapted to emit the second modulated optical signal according to the information to be communicated to the data transmission/reception unit 30.

The first light source 33 of the data transmission/reception unit 30 and the light source of the piece of equipment 70 preferentially emit at a different wavelength in the infrared range.

The second modulated optical signal coming from the piece of equipment 70 passes through an optical interface 50, is transported by an optical fibre 40 to the data transmission/reception unit 30, and then directed, via an optical module 34, to an acquisition device 35 of the communication system 10.

Each optical fibre 40 advantageously allows the transport of a modulated optical signal in the direction of downward communication (first modulated optical signal) and in that of the upward communication (second modulated optical signal).

Each optical module 34, besides the fact of coupling the first modulated optical signal coming from a first light source 33 on an optical fibre 40, is advantageously adapted to separate the wavelengths specific to each modulated optical signal to/from the optical fibre 50 (that is to say the wavelength of the first infrared modulated optical signal, in the downward communication direction, and the wavelength of the second infrared modulated optical signal, in the upward communication direction).

In a variant of this first configuration of the communication system 10, illustrated in FIG. 3, said system may comprise several data transmission/reception units 30.

Such a variant can be considered, for example for an aircraft comprising a number of seats 21 for the passengers and a number of areas to be covered for the CCM which are relatively large, such as a long-haul aircraft.

The number of data transmission/reception units 30 may vary depending on the number of seats 21, the number of areas to be covered for the CCM, the number of optical fibres 40 at the output, or else the throughput performance that the user (passenger or CCM member) needs.

In the non-limiting example of FIG. 3, the communication system 10 is intended to transmit data to and from five privileged spaces 25. It comprises two data transmission/reception units 30, a first data transmission/reception unit 30 to serve three privileged spaces (three passenger seats), a second data transmission/reception unit 30 to serve two privileged spaces (a galley space 23 and part of the corridor 22). The first data transmission/reception unit 30 comprises three first light sources 33. Each first light source 33 is connected, via an optical fibre 40, to an optical interface 50 disposed at a passenger seat 21. The second data transmission/reception unit 30 comprises two first light sources 33. One first light source 33 is connected, via an optical fibre 40, to an optical interface 50 disposed at part of the corridor 22. Another first light source 33 is connected, via an optical fibre 40, to an optical interface 50 disposed at the galley space 23.

Figure 5:
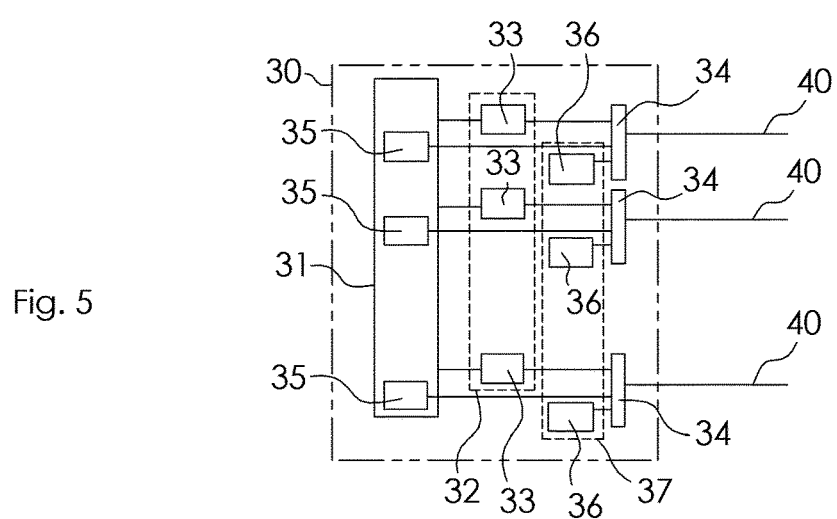
FIG. 5 illustrates an example of a data transmission/reception unit of the communication system of FIG. 4.

In a second configuration of the communication system 10, illustrated in FIGS. 4 and 5, said communication system 10 is adapted, in addition to the transmission/reception of data, to transmit visible light in the privileged spaces 25.

For this second configuration, the data transmission/reception unit 30 comprises a plurality of second light sources 36.

Each second light source 36 is adapted to emit an optical signal in the visible range, preferably a white light optical signal. This optical signal will be referred to hereinafter as visible optical signal.

Each second light source 36 is, for example, a light-emitting diode, a laser, a combination of light-emitting diodes or a combination of lasers.

In a preferred embodiment, a second light source is a combination of at least two visible light-emitting diodes (or a combination of lasers), each emitting a different colour temperature to create mood light to the privileged space 25 associated with this second light source.

The data transmission/reception unit 30 preferably comprises as many second light sources 36 as there are first light sources 33. Each second light source 36 is configured to emit an optical signal visible in a single privileged space 25.

The set of second light sources preferably forms a second emission module 37.

In an exemplary embodiment, illustrated in FIG. 5, the second transmission module 37 is disposed in the data transmission/reception unit 30.

In this second configuration, each optical module 34 is adapted to couple the first modulated optical signal coming from a first light source 33 and the visible optical signal coming from a second light source 36 in a single optical fibre 40.

Each optical module 34 is also adapted to combine and/or separate the wavelengths specific to each optical signal to/from the optical fibre 40 (that is to say the wavelength of the visible optical signal, the wavelength of the first infrared modulated optical signal, in the downward direction, and the wavelength of the second infrared modulated optical signal, in the upward direction).

In an exemplary embodiment, the optical module 34 comprises a multiplexer and a demultiplexer.

Each optical fibre 40 is also adapted to transport both the visible optical signal and the first and second infrared modulated optical signals.

In an embodiment, the communication system 10 comprises a device 60 for controlling the turning on/off of the optical signal visible in a privileged space 25, accessible to the passenger, to allow him to turn on or off the visible light, without impacting data communication.

In an exemplary embodiment, the control device 60 is a push button disposed near the optical interface 50.

The communication system 10, in this second configuration, thus allows to advantageously separate the light distribution from the data distribution function.

Thus, the communication system 10 advantageously allows to distribute data, even when the visible light is turned off.

In one variant embodiment (not shown) of the second configuration of the communication system, the data transmission/reception unit 30 comprises a second light source 36 of sufficient power to emit an optical signal visible for several privileged spaces 25, or even a single second light source 36 of sufficient power to emit an optical signal visible in all the privileged spaces 25 served by the data transmission/reception unit 30.

Figure 7:
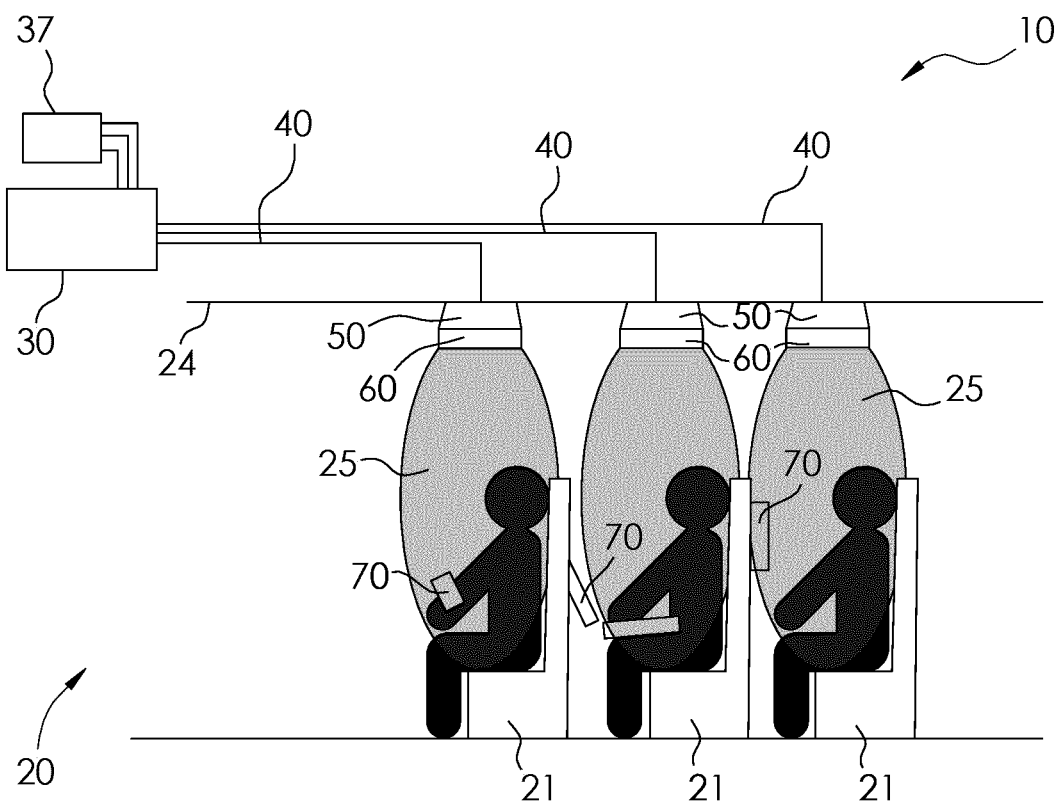
FIG. 7 illustrates a schematic representation of an aircraft cabin incorporating a variant of the second configuration of the communication system.
Figure 8:
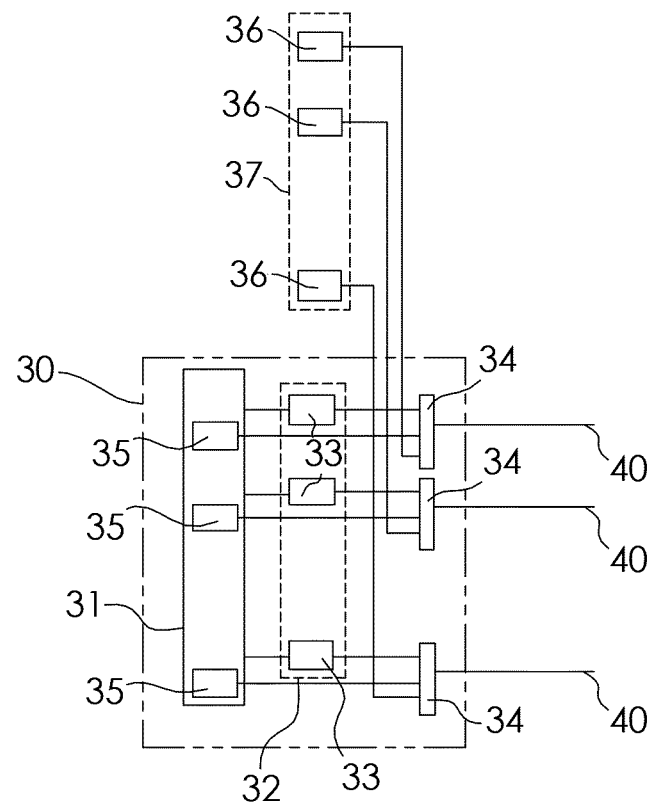
FIG. 8 illustrates an example of a data transmission/reception unit of the communication system of FIG. 7.

In another variant embodiment of the second configuration of the communication system, as illustrated in FIGS. 7 and 8, the second transmission module 37 is disposed outside the data transmission/reception unit 30. Such an arrangement advantageously allows to physically separate the various functions of the communication system:
the data transmission/reception unit 30 allows the distribution of data to the privileged space,
the second emission module 37 allows the generation of lighting in the privileged space.

Figure 6:
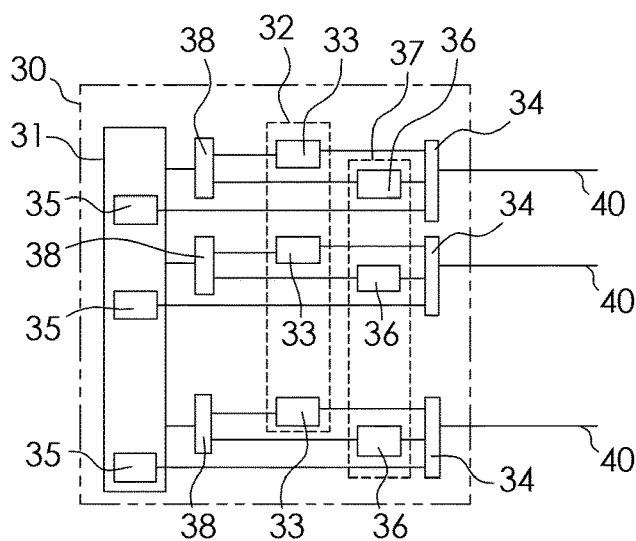
FIG. 6 illustrates another example of a data transmission/reception unit of the communication system of FIG. 4.

In another variant embodiment of the second configuration of the communication system, as illustrated in FIG. 6, the communication system is configured to allow data communication via visible or infrared light. In this variant, the second light sources 36 are therefore adapted to emit a modulated optical signal to transmit the data. It is quite clear that the modulated optical signal is of the Li-Fi type.

In this variant, the communication system further comprises a plurality of switching devices 38.

Preferably, the plurality of switching devices 38 are disposed in the data transmission/reception unit 30, between, on the one hand, the control unit 31, and on the other hand, the first light sources 33 and the second light sources 36.

It will be understood that there are as many switching devices 38 as there are first light sources 33 and second light sources 36.

A switching device 38 is preferably configured:
when an associated privileged space is lighted by a second light source, to deactivate the first light source so that data communication is carried out only by the second light source,
when an associated privileged space is not lighted by a second light source, to activate the first light source so that data communication is carried out only by the first light source.

In other words, when a second light source is inactive (i.e. the privileged space is not lighted), the first light source 33 receives an instruction from the control unit and is controlled to emit a first infrared modulated optical signal containing the data to be transmitted. When a second light source is active (i.e. the privileged space is lighted), the first light source 33 does not receive any instruction from the control unit. The second light source receives an instruction from the control unit and is controlled to emit a modulated visible optical signal containing the data to be transmitted.

Such a variant advantageously allows to reduce the power consumption of the communication system 10 for transmitting the data using only, either:
a second light source 36, when the privileged space 25 is lighted by said second light source; the functions of light and data distribution are combined;
a first light source 32, when the privileged space 25 is not lighted; the function of light distribution is separated from that of data distribution; the data are distributed even when the light is turned off.

Although the invention has been described in the case of a two-way data communication between the communication system and a single piece of equipment in a privileged space, it is clear that the communication system of the invention can establish a two-way communication with several pieces of equipment located in the same privileged space, simultaneously or not, provided that each piece of equipment comprises a light source and an acquisition module as described above.

The invention claimed is:

1. A communication system to transmit data to and from a plurality of defined privileged spaces by modulated optical signals of a Li-Fi signal type, comprising:
a plurality of first light sources, each first light source configured to emit, in an infrared, a first modulated optical signal of the Li-Fi signal type;
a plurality of optical fibers;
a plurality of optical interfaces, one optical interface at an end of each optical fiber;
wherein each optical fiber being configured to guide the first modulated optical signal from only one of the plurality of first light sources in a direction of one of the plurality of optical interfaces configured to broadcast the first modulated optical signal into a defined privileged space; and wherein each optical fiber being configured to transport a second modulated optical signal from an associated defined privileged space in a direction of an acquisition device configured to acquire the second modulated optical signal.

2. The communication system of claim 1, further comprising a single second light source configured to emit a visible optical signal in a visible spectrum to illuminate a set of defined privileged spaces, each optical fiber being configured to guide the first modulated optical signal from only said one of the plurality of first light sources and the visible optical signal from the second light source, in the direction of said one of the plurality of optical interfaces.

3. The communication system of claim 2, further comprising a controller to control the single second light source to turn on and off the visible optical signal in a defined privileged space.

4. The communication system of claim 1, further comprising a plurality of second light sources, each second light source configured to emit a visible optical signal in the visible spectrum to illuminate a single defined privileged space, each optical fiber being configured to guide the first modulated optical signal from only one of the plurality of first light sources and the visible optical signal from only one of the plurality of second light sources, in the direction of one of the plurality of optical interfaces.

5. The communication system of claim 4, wherein each second light source is configured to emit a modulated visible optical signal; and further comprising a plurality of switching devices, each switching device being associated a defined privileged space, each switching device being configured to:

deactivate a first light source associated with said defined privileged space in response to illumination of said defined privileged space by a second light source associated with said defined privileged space; and activate the first light source associated with said defined privileged space in response to non-illumination of said defined privileged space by the second light source associated with said defined privileged space.

6. The communication system of claim 4, wherein each second light source is a combination of at least two light-emitting diodes or lasers, said each second light source configured to emit a different color temperature to create a mood light in said defined privileged space associated with said each second light source.

7. The communication system of claim 4, wherein the plurality of first light sources, the plurality of second light sources and the plurality of acquisition devices are arranged in a data transmission device configured to transmit and receive data.

8. The communication system of claim 4, wherein the plurality of first light sources and the plurality of acquisition devices are arranged in a data transmission device configured to transmit and receive data, and the plurality of second light sources are arranged outside the data transmission device.

9. An aircraft comprising the communication system of claim 1.

* * * * *